US011272255B2

United States Patent
Ogiso et al.

(10) Patent No.: US 11,272,255 B2
(45) Date of Patent: Mar. 8, 2022

(54) INFORMATION PROCESSING APPARATUS AND VIDEO SPECIFICATION SETTING METHOD

(71) Applicant: SONY INTERACTIVE ENTERTAINMENT INC., Tokyo (JP)

(72) Inventors: Toru Ogiso, Tokyo (JP); Naoki Kitahara, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 24 days.

(21) Appl. No.: 16/316,138

(22) PCT Filed: Feb. 23, 2017

(86) PCT No.: PCT/JP2017/006945
§ 371 (c)(1),
(2) Date: Jan. 8, 2019

(87) PCT Pub. No.: WO2018/012020
PCT Pub. Date: Jan. 18, 2018

(65) Prior Publication Data
US 2020/0053311 A1    Feb. 13, 2020

(30) Foreign Application Priority Data
Jul. 15, 2016  (JP) .............................. JP2016-140746

(51) Int. Cl.
*H04N 5/46*    (2006.01)
*H04N 9/64*    (2006.01)
(Continued)

(52) U.S. Cl.
CPC .............. *H04N 21/47* (2013.01); *H04N 5/46* (2013.01); *H04N 9/646* (2013.01); *H04N 9/735* (2013.01);
(Continued)

(58) Field of Classification Search
CPC ...... H04N 5/44513; H04N 5/46; H04N 9/646; H04N 9/735; H04N 21/44029; H04N 2005/44517
(Continued)

(56) References Cited

U.S. PATENT DOCUMENTS

| | | | |
|---|---|---|---|
| 9,100,631 B2 * | 8/2015 | Broberg | H04N 7/0127 |
| 2008/0151119 A1 * | 6/2008 | Suzuki | H04N 5/775 |
| | | | 348/569 |

(Continued)

FOREIGN PATENT DOCUMENTS

| | | |
|---|---|---|
| JP | 2004-325818 A | 11/2004 |
| JP | 2008-076775 A | 4/2008 |

(Continued)

OTHER PUBLICATIONS

International Search Report and Written Opinion dated May 23, 2017, from International Application No. PCT/JP2017/006945, 8 sheets.

(Continued)

*Primary Examiner* — John W Miller
*Assistant Examiner* — Omer Khalid
(74) *Attorney, Agent, or Firm* — Katten Muchin Rosenman LLP

(57) ABSTRACT

A screen generating part 114 generates an output setting screen on which a user selects settings of multiple items regarding specifications for video data to be output to a display device 4. A setting registering part 110 registers the settings selected by the user on the output setting screen. A screen generating part 114 generates the output setting screen on which the user selects the settings for a first item and a second item, the first item having a first value and a second value as selectable settings, the second item having a third value and a fourth value as selectable settings. When (Continued)

the user selects the first value for the first item, the setting registering part 110 registers the first value for the first item and also registers the third value for the second item. When the user selects the fourth value for the second item, the setting registering part 110 registers the fourth value for the second item and also registers the second value for the first item.

5 Claims, 10 Drawing Sheets

(51) Int. Cl.
*H04N 9/73* (2006.01)
*H04N 21/4402* (2011.01)
*H04N 21/47* (2011.01)
*H04N 21/485* (2011.01)

(52) U.S. Cl.
CPC ..... *H04N 21/44029* (2013.01); *H04N 21/485* (2013.01)

(58) Field of Classification Search
USPC .......................................................... 348/569
See application file for complete search history.

(56) References Cited

U.S. PATENT DOCUMENTS

| | | | |
|---|---|---|---|
| 2011/0176056 A1* | 7/2011 | Toba | H04N 21/4363 |
| | | | 348/552 |
| 2015/0215671 A1* | 7/2015 | Lewis | H04N 21/45455 |
| | | | 725/131 |
| 2016/0127771 A1* | 5/2016 | Pasqualino | G09G 5/006 |
| | | | 348/474 |

FOREIGN PATENT DOCUMENTS

| | | |
|---|---|---|
| JP | 2008-158220 A | 7/2008 |
| JP | 2011-250319 A | 12/2011 |
| JP | 2016-085769 A | 5/2016 |
| WO | 2014/203869 A1 | 12/2014 |

OTHER PUBLICATIONS

Instruction manual, Blu-ray disk recorder, product No. DMR-UBZ1, Panasonic Corporation, 2015, pp. 171-185.
Notification of Reason for Refusal dated Apr. 9, 2019, from Japanese Patent Application No. 2016-140746, 2 sheets.
International Preliminary Report on Patentability dated Jan. 15, 2019, from International Application No. PCT/JP2017/006945, 10 sheets.

* cited by examiner

FIG.3

| | | |
|---|---|---|
| TITLE NAME | : | ABC SURVIVAL |
| RENDERING RESOLUTION | : | 2160P |
| AUDIO OUTPUT | : | 7:1 |
| OUTPUT ENCRYPTION (HDCP) | : | REQUIRED |
| HDCP VERSION | : | 2.2 |
| DEEP COLOR | : | 10 BITS |
| HDR TECHNIQUE | : | HDR10 |
| ⋮ | | |
| PARENTAL LOCK | : | 12 YEARS OLD |

PARAM

INFORMATION PROCESSING APPARATUS AND VIDEO SPECIFICATION SETTING METHOD

TECHNICAL FIELD

The present invention relates to an information processing apparatus for transmitting video data to display device, or to information processing technology for use with the information processing apparatus.

BACKGROUND ART

Patent Literature 1 discloses technology for setting the format of videos to be output to a display device in accordance with the environment in which a given application is executed. According to the technology disclosed in Patent Literature 1, in the case where there exist multiple combinations of rendering resolutions set for the application and video formats in which the display device can output videos, the video format associated with the highest prioritized combination is selected from an association table.

In recent years, the development of technology has advanced to enable display devices to provide improved luminance and enhanced contrast. The techniques for processing High Dynamic Range (HDR) videos in which luminance range is expanded as opposed to Standard Dynamic Range (SDR) videos have thus been drawing attention.

The quality of digital videos is determined by plane resolution, color depth, frame rate (temporal resolution), color gamut, and luminance range. The International Telecommunication Union-Radiocommunication Sector (ITU-R) BT.2020 for Ultra-High Definition (UHD) specifies these elements for ultra-high-definition video display. Whereas the ITU-R BT.709, which is a full-high-definition standard, specifies that the luminance range is to be from 0 to 100 nit, the ITU-R BT.2020 expands the luminance range to be from 0 to 10,000 nit. HDR videos present yet-to-be-reproduced brightness almost as seen by the naked eye and reproduce something glaringly bright in the real world such as sunlight in a manner more real than before on display devices.

CITATION LIST

Patent Literature

[PTL 1]
JP 2008-76775A

SUMMARY

Technical Problem

Display devices to be developed from now on are expected gradually to incorporate the HDR output function as a standard feature. Users are prompted to select the setting for enabling or disabling the HDR output function. The selecting operation may be performed in a suitably timed manner, such as when the display device is connected to an information processing apparatus at initialization time. At this time, the user is prompted not only to set the enabling or disabling of the HDR output function but also to set various other specifications regarding video data. It is thus preferred that a suitable user interface be provided to let the user set the specifications easily without complicating the process of setting output video specifications.

Incidentally, the ultra-high definition of video data has aroused a demand for preventing illegal copying of such video data. As one copy protection technology, there is the High-bandwidth Digital Content Protection (HDCP) protocol for encrypting transmission channels between the information processing apparatus and the display device. In addition to HDCP 1.4, which is today's mainstay copy protection protocol, HDCP 2.2 has been worked out anew to provide more vigorous protection of video data. The display devices to be developed from now on are called on to comply not only with HDCP 1.4 but also with HDCP 2.2.

Solution to Problem

In solving the above problem and according to one embodiment of the present invention, there is provided an information processing apparatus for transmitting video data to a display device. The information processing apparatus includes: a screen generating part configured to generate an output setting screen on which a user selects settings of multiple items regarding specifications for the video data to be output to the display device; and a setting registering part configured to register the settings selected by the user on the output setting screen. The screen generating part generates the output setting screen on which the user selects the settings of a first item and a second item, the first item having a first value and a second value as selectable settings, the second item having a third value and a fourth value as selectable settings. When the user selects the first value for the first item, the setting registering part registers the first value for the first item and also registers the third value for the second item. When the user selects the fourth value for the second item, the setting registering part registers the fourth value for the second item and also registers the second value for the first item.

According to another embodiment of the present invention, there is provided a video specification setting method for setting specifications for video data to be output to a display device. The video specification setting method includes: a step of generating an output setting screen on which a user selects settings of multiple items regarding the specifications for the video data to be output to the display device; and a step of registering the settings selected by the user on the output setting screen. The output setting screen generating step generates the output setting screen on which the user selects the settings or a first item and a second item, the first item having a first value and a second value as selectable settings, the second item having a third value and a fourth value as selectable settings. When the user selects the first value for the first item, the setting registering step registers the first value for the first item and also registers the third value for the second item. When the user selects the fourth value for the second item, the setting registering step registers the fourth value for the second item and also registers the second value for the first item.

Incidentally, if other combinations of the above-outlined composing elements or the above expressions of the present invention are converted between different forms such as a method, an apparatus, a system, a recording medium, and a computer program, they still constitute effective embodiments of the present invention.

Advantageous Effect of Invention

The present invention thus provides techniques for simply setting the specifications for video data to be output to a display device.

BRIEF DESCRIPTION OF DRAWINGS

FIG. 3 is a schematic diagram depicting typical parameter information described in a PARAM file.

DESCRIPTION OF EMBODIMENTS

Figure 1:
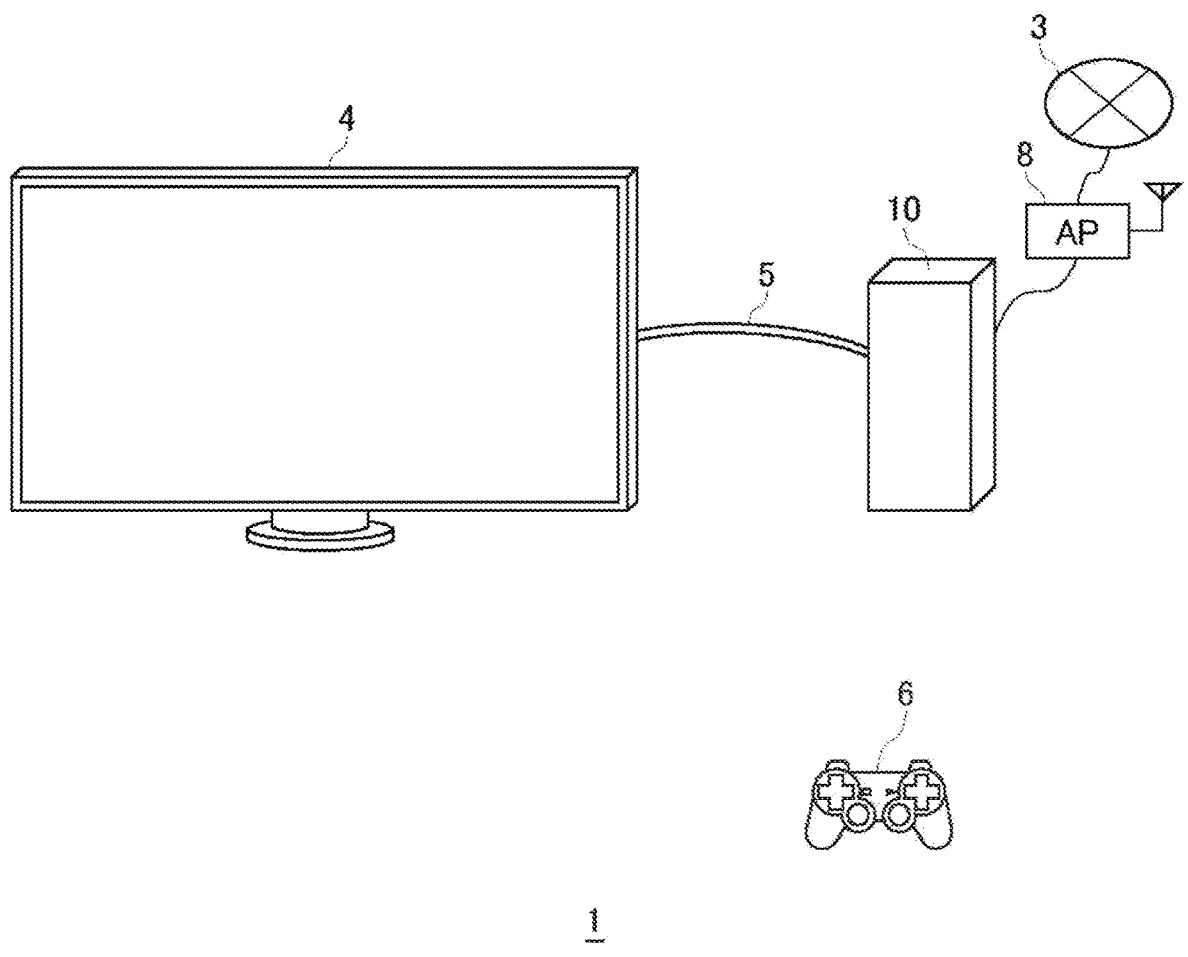
FIG. 1 is a schematic diagram depicting a typical information processing system.

FIG. 1 depicts an information processing system 1 as one embodiment of the present invention. The information processing system 1 includes an information processing apparatus 10 as a user terminal, an input apparatus 6 to be operated by the user, and a display device 4. An access point (referred to as the AP hereunder) 8 has the functions of a wireless access point and a router. The information processing apparatus 10 connects to the AP 8 in wired or wireless fashion in order to connect with a network 3. The information processing apparatus 10 is connected with an auxiliary storage apparatus (not illustrated) via a Universal Serial Bus (USB) cable. The auxiliary storage apparatus, typically constituted by a Hard Disk Drive (HDD) or by a flash memory, may be incorporated in the information processing apparatus 10.

The information processing apparatus 10 may be a game machine that executes applications. The input apparatus 6 may be a device that provides the user's operation signals to the information processing apparatus 10 such as a game controller. The input apparatus 6 may be a device capable of providing the information processing apparatus 10 with the user's operation signals not only from the game controller but also from such devices as a keyboard, a mouse, joysticks, or a touch pad.

The display device 4 is a television set that possesses a video output function and an audio output function, and has a display unit such as a liquid crystal display, a plasma display, or an organic EL display. Alternatively, the display device 4 may be a projector. The display device 4 of the embodiment is compatible with High-Definition Multimedia Interface (HDMI; registered trademark) and includes an HDR output function and a deep color output function.

When receiving the user's operation signals from the input apparatus 6, the information processing apparatus 10 generates video data reflecting the operation signals and outputs the generated data to the display device 4. For example, the information processing apparatus 10 generates video game data by having the use operation signals reflected in the processing of a game application, and outputs the generated data to the display device 4. Also, the information processing apparatus 10 may reproduce moving image data of a movie, for example, in response to the user's operation signals and output the reproduced data to the display device 4.

The information processing apparatus 10 and the display device 4 are interconnected via an HDMI cable 5. Alternatively, the information processing apparatus 10 and the display device 4 may be interconnected via wireless HDMI. In the embodiment, digital data transmitted between the information processing apparatus 10 and the display device 4 is encrypted using the HDCP protocol. Under the HDCP protocol, the information processing apparatus 10 transmitting the digital data encrypts the transmitted data by authenticating the display device 4 and by sharing an encryption key for the digital data with the display device 4.

With the embodiment, it is assumed that the information processing apparatus 10 complies with two versions of the HDCP protocol, i.e., HDCP 1.4 and HDCP 2.2. Alternatively, the information processing apparatus 10 may comply with other versions of the HDCP protocol. On the other hand, the display device 4 is to comply at least with HDCP 1.4. Depending on the device type, the display device 4 may also comply with HDCP 2.2. On the basis of a request from the currently executing application, the information processing apparatus 10 determines the version of HDCP to be used, encrypts the digital data using the HDCP protocol of the determined version, and transmits the encrypted data to the display device 4. This makes it possible to prevent eavesdropping or falsification of digital data being transmitted over the HDMI cable 5.

Figure 2:
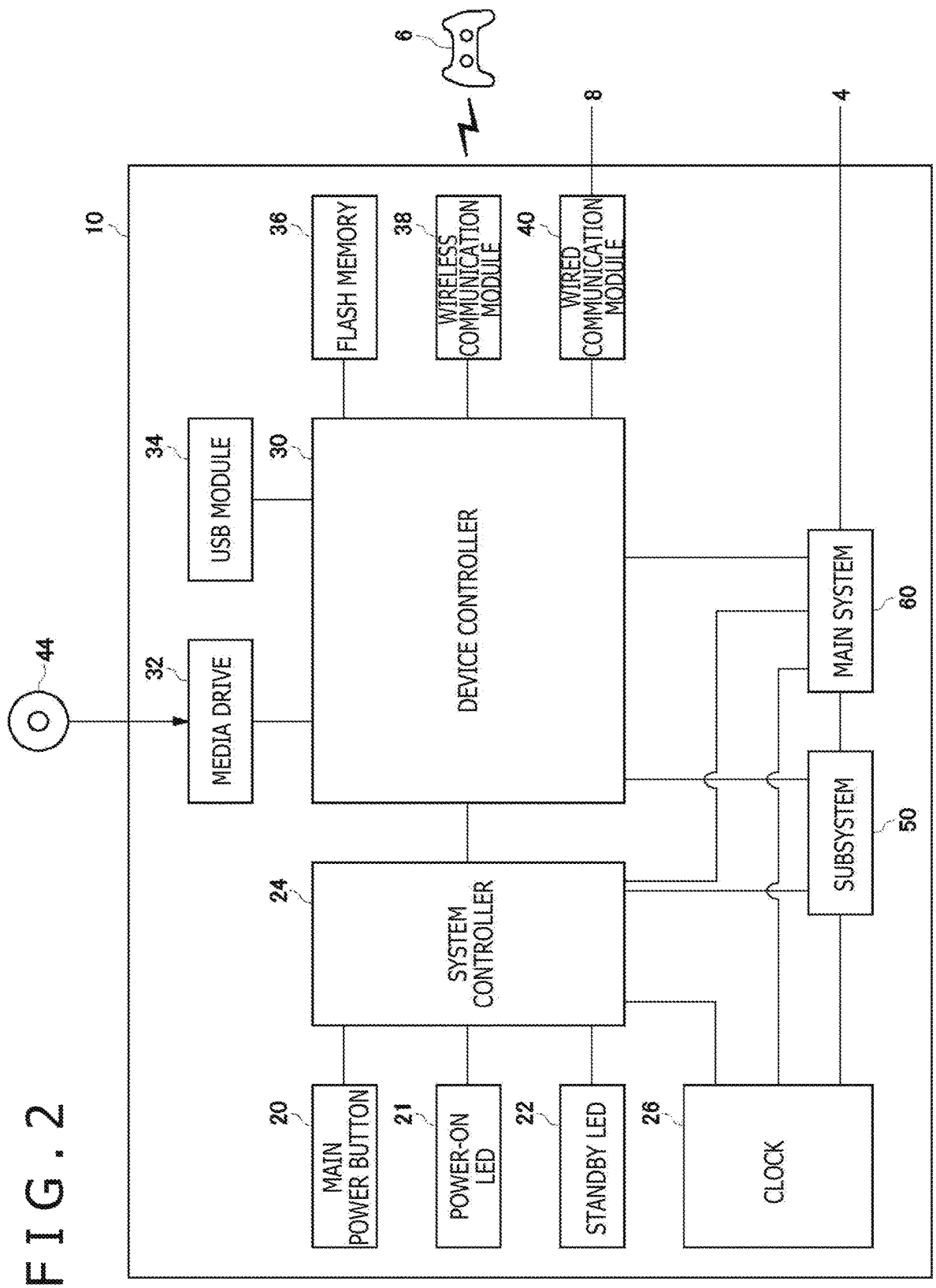
FIG. 2 is a schematic diagram depicting functional blocks of an information processing apparatus.

FIG. 2 depicts functional blocks of the information processing apparatus 10. The information processing apparatus 10 is configured with a main power button 20, a power-ON Light-Emitting Diode (LED) 21, standby LED 22, a system controller 24, clock 26, a device controller 30, a media drive 32, a USB module 34, a flash memory 36, a wireless communication module 38, a wired communication module 40, a subsystem 50, and a main system 60.

The main system 60 includes a main Central Processing Unit (CPU), a memory as a main storage unit, a memory controller, and a Graphics Processing (CPU). The CPU is used primarily for arithmetic processing of game programs. These functions may be configured as a system-on-chip formed on a single chip. The main CPU starts, up the Operating System (OS), and offers the function of executing an plication installed the auxiliary storage apparatus or recorded on a Read Only Memory (ROM) medium 44 in the environment provided by the OS.

The subsystem 50 includes a sub CPU, a memory as a main storage unit, and a memory controller, and excludes the GPU. The sub CPU operates when the main CPU is in standby state. The processing functions of the sub CPU are limited so that its power dissipation may be minimized. When the main system 60 is in the standby state, the information processing apparatus 10 of this embodiment maintains the state of continuously signing in to a network service provided by a server (not illustrated) on the network 3 because the subsystem 50 remains active.

The main power button 20 is an input part on which the user performs an input operation. Located at the front of the enclosure of the information processing apparatus 10, the main power button 20 is operated to turn on or off the supply of power to the main system 60 of the information processing apparatus 10. The power-ON LED 21 is lit when the main system 60 is in an active state. The standby LED 22 is lit when the main system 60 is in the standby state.

The system controller 24 detects whether the main power button 20 is pressed by the user. If the main power button 20 is pressed when the main power supply is turned off, the system controller 24 acquires the pressing action as an "ON-instruction." On the other hand, if the main power button 20 is pressed when the main power supply is turned on, the system controller 24 acquires the pressing action as an "OFF-instruction."

The clock 26 is a real-time clock that generates the current date and time information. The clock 26 supplies the generated information to the stem controller 29, subsystem 50, and main system 60.

The device controller 30 is configured as Large-Scale Integrated Circuit (LSI) that permits transfer of information between devices, as does the Southbridge. As illustrated, the device controller 30 is connected with such devices as the system controller 24, media drive 32 USB module 34, flash memory 36, wireless communication module 38, wired communication module 40, subsystem 50, and main system 60. The device controller 30 controls the timing of data transfers by absorbing differences in electrical characteristics and data transfer rates between the devices.

The media drive 32 as a drive apparatus is loaded with the ROM medium 44 on which application soft such as games and their license information are recorded. The media drive 32 drives the loaded ROM medium 44 to read programs and data therefrom. The ROM medium 44 constitutes a read-only recording medium such as an optical disk, a magneto-optical disk, or a Blu-ray disk.

The USB module 34 is a module that connects with an external device via a USB cable. The USB module 34 may be connected with the auxiliary storage apparatus via a USB cable. The flash memory 36 is an auxiliary storage apparatus that constitutes internal storage. The wireless communication module 38 communicates wirelessly with the input apparatus 6, for example, under a communication protocol such as the Bluetooth (registered trademark) protocol or the Institute of Electrical and Electronic Engineers (IEEE) 802.11 protocol. Incidentally, the wireless communication module 38 may comply with the fourth-generation digital mobile phone system or with the digital mobile phone system of some other generation. The wired communication module 40 is connected with the network 3 via the AP 8.

The information processing apparatus 10 of the embodiment has the function of generating video data of applications for transmission to the display device 4 at multiple plane resolutions (rendering resolutions). The resolutions are as follows:

(1) 720 p (1280×720)
(2) 1080 i (1920×1080)
(3) 1080 p (1920×1080)
(4) 2160 p (3840×2160)

Here, the resolutions (1) 720 p, (2) 1080 i, and (3) 1080 p are supported by high-definition (HD) television, and the resolution (4) 2160 p is supported by 4K Ultra High Definition (UHD) television. What follows is an explanation about the video data or game applications. Other applications that output video data such as a moving image reproducing application are also usable.

The game application includes at least a game program for advancing the game, game data to be used by the game program, content information regarding the game, and parameter information related to generating video and audio data. The game data includes the data about the stages to be developed during the game and character data. The content information is data that includes icon images of, and explanatory information about, the application.

The parameter information includes setting information that defines the data specifications such as the rendering resolution of the game and version information regarding the HDCP for encrypting the Audio-Visual (AV) data of the game. The parameter information, read in before the game program is started, is used to set the video data specifications for the game, such as the rendering resolution and the HDCP version for use in data encryption.

FIG. 3 depicts typical parameter information described in PARAM file. The parameter information includes the title name, rendering resolution, audio output format, execution/non-execution of output encryption, HDCP version for output encryption, deep color depth, HDR technique to be used, . . . , and age information for the parental lock function, for example. Of these settings, those about rendering resolution, color depth, and HDR technique define the specifications for generating video data. The audio output format defines the specifications for generating audio data. The HDR technique determines at least the luminance range of video data.

In the PARAM file illustrated in FIG. 3, the title name is set to "ABC Survival"; the rendering resolution is set to "2160 p"; the audio output format is set to "7.1 ch"; the output encryption using HDCP is set to "Required"; the HDCP version to be used is set to "2.2"; the color depth of each color is set to "10 Bits"; the HDR technique is set to "HDR 10"; . . . , and the age information for the parental lock function is set to "12 Years Old."

Figure 4:
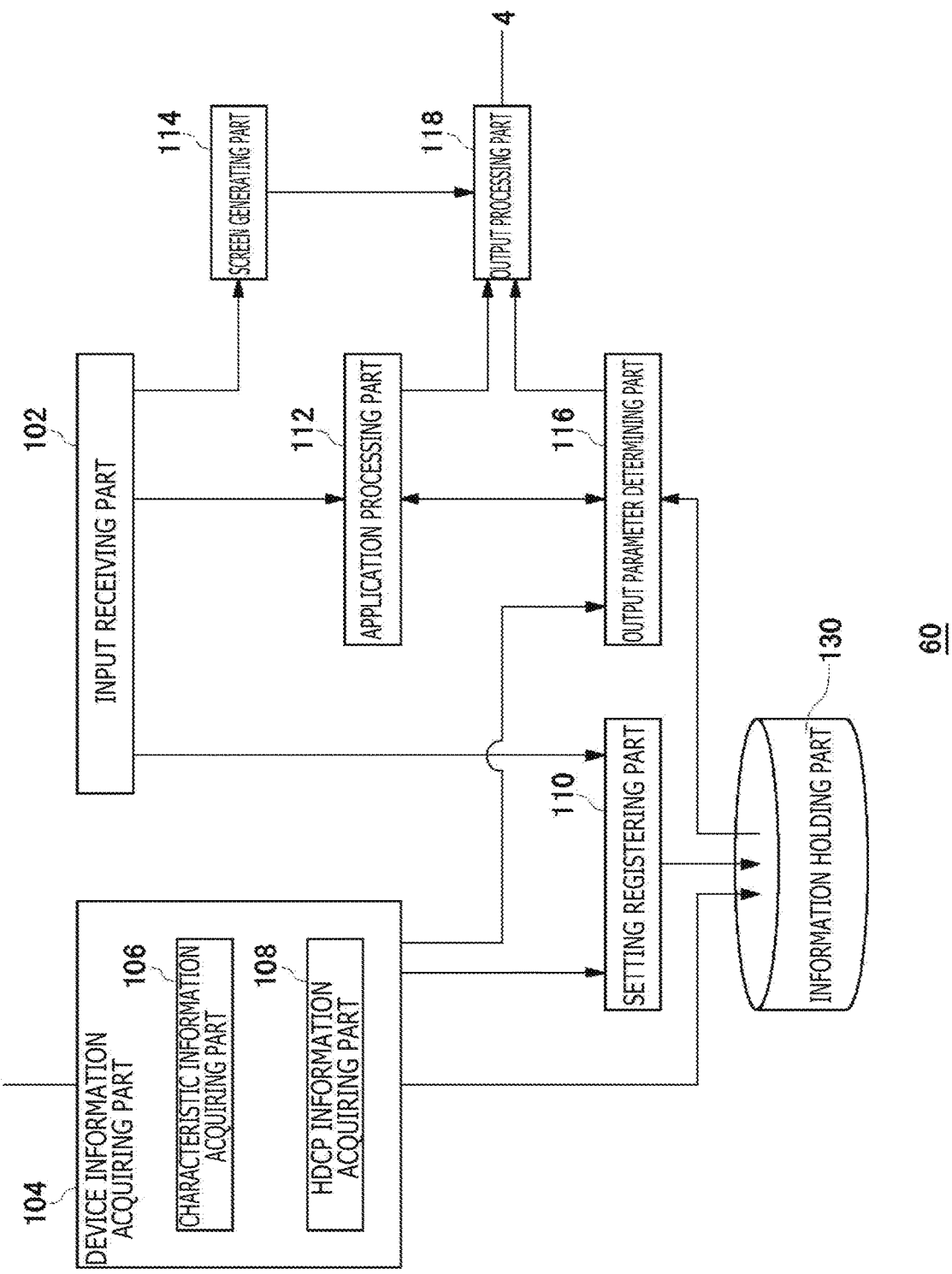
FIG. 4 is a schematic diagram depicting a configuration of a main system.

FIG. 4 depicts a configuration of the main system 60. The main system 60 includes an input receiving part 102, a device information acquiring part 104, a setting registering part 110, an application processing part 112, a screen generating part 114, an output parameter determining part 116, and an output processing part 118. The device information acquiring part 104 includes a characteristic information acquiring part 106 and an HDCP information acquiring part 108.

The elements depicted in FIG. 4 as functional blocks for performing diverse processes may be configured with hardware such as a Central Processing Unit (CPU), a memory, and other LSIs, or with software such as programs including the OS program and the game program loaded into the memory. It will be understood by those skilled in the art that these functional blocks can be implemented with hardware alone, with software aloe, or in diverse forms through combinations of hardware and software and that none of these implementations is limitative of the present invention.

When an HDMI device is connected with the information processing apparatus 10, the device information acquiring part 104 performs device authentication with the connected HDMI device. The display device 4, which is an HDMI device, includes an Extended Display Identification Data (EDID) circuit. When connected with the information processing apparatus 10 via the HDMI cable 5, the display device 4 as an HDMI device allows its EDID circuit, currently supplied with power, to communicate with the device information acquiring part 104.

The characteristic information acquiring part 106 requests the display device 4 to transmit EDID information. The EDID information includes attribute information regarding the display device 4 and characteristic information for designating the parameters for output-ready video and audio data. The EDID information as the attribute information includes the manufacturer's name, model name, serial number, and manufacturing date. The EDID information as the characteristic information includes at least the recommended resolution and refresh rate for the display unit, unrecommended but display-ready resolutions and refresh rates, and color characteristics. The EDID information further includes, as auxiliary characteristic information, physical screen size, transmission characteristic (gamma characteristic) of the display unit, Three Dimensional (3D) video format, deep color depth, information indicative of whether HDR output is available, and the HDR technique supported when HDR output is available. When the device information acquiring part 104 recognizes an HDMI device being connected, the characteristic information acquiring part 106 requests transmission of the EDID information and acquires that EDID information from the display device 4. The characteristic information acquiring part 106 supplies the acquired EDID information to the setting registering part 110.

When supplied with the EDID information from the characteristic information acquiring part 106, the setting registering part 110 sets default values of multiple items regarding specifications for video data to be output to the display device 4 (the specifications may be referred to as the video specifications hereunder) on the basis of the EDID information.

If the EDID information includes the screen size "50 Inches" as the physical screen size, the setting registering part 110 sets the television size of the display device 4 to "50 Inches." Also, if the EDID information includes information indicative of the availability of HDR output, the setting registering part 110 sets the enabling of the HDR output function of the display device 4 and also sets the enabling of its deep color output function. The setting registering part 110 registers the information set for the various items to an information holding part 130.

On a video output setting screen of the information processing apparatus 10 of the embodiment, the user may manually select the settings of multiple items regarding the video specifications and have the selected settings registered. Incidentally, the setting registering part 110 has the video specifications set to default on the basis of the EDID information. Thus an initial video output setting screen presented to the user displays the default settings based on the EDID information. The user may change the default settings as desired by operating the input apparatus 6.

Figure 5:
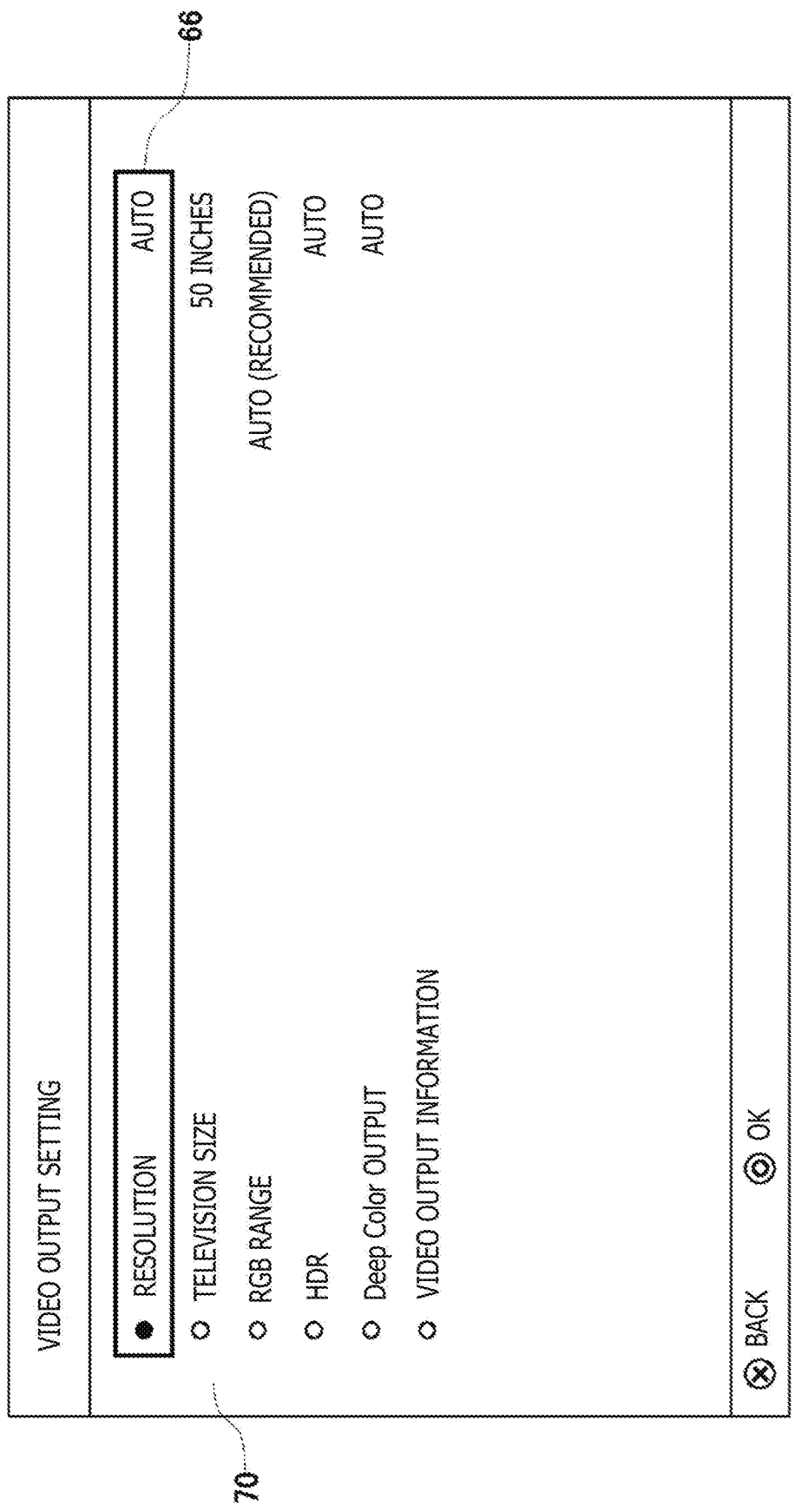
FIG. 5 is a schematic diagram depicting a typical video output setting screen.

FIG. 5 depicts a typical video output setting screen. The screen generating part 114 generates a video output setting screen 70 that allows the user to select the settings of multiple items regarding specifications for video data to be output to the display device 4. The video output setting screen 70 thus generated is displayed on the display device 4. The screen generating part 114, implemented as one function of the OS, presents the user with the video output setting screen 70 as a system setting screen.

The video output setting screen 70 displays such items as "Resolution," "Television Size," "Red, Green, Blue (RGB) Range," "HDR," and "Deep Color Output" for defining the video specifications for output to the display device 4. On the initial screen, the rightmost field in the display region of each item displays a default setting established on the basis of the EDID information. Incidentally, the item of "Video Output Information," when selected, provides a user interface for displays the set video output information.

On the initial screen, the setting of "Television Size" is defaulted to "50 Inches" in accordance with "Physical Screen Size" included in the EDID information. Because the EDID information includes information indicating the availability of HDR output, the setting of the HDR output function of the display device 4 is defaulted to "Auto," and the setting of the deep color output function is defaulted to "Auto." If the EDID information includes information indicating the unavailability of HDR output, both the HDR output function and the deep color output function are defaulted to "Off" (disabled).

The video output setting screen 70 displays a focus frame 66 for selecting items of the video specifications. By operating the input apparatus 6, the user moves the focus frame 66 to select the tem of which the setting is desired to be changed. When the focus frame 66 is placed onto the "Resolution" display region and the user presses an OK button of the input apparatus 6, the screen generating part 114 displays the selection region for the setting of "Resolution."

Figure 6:
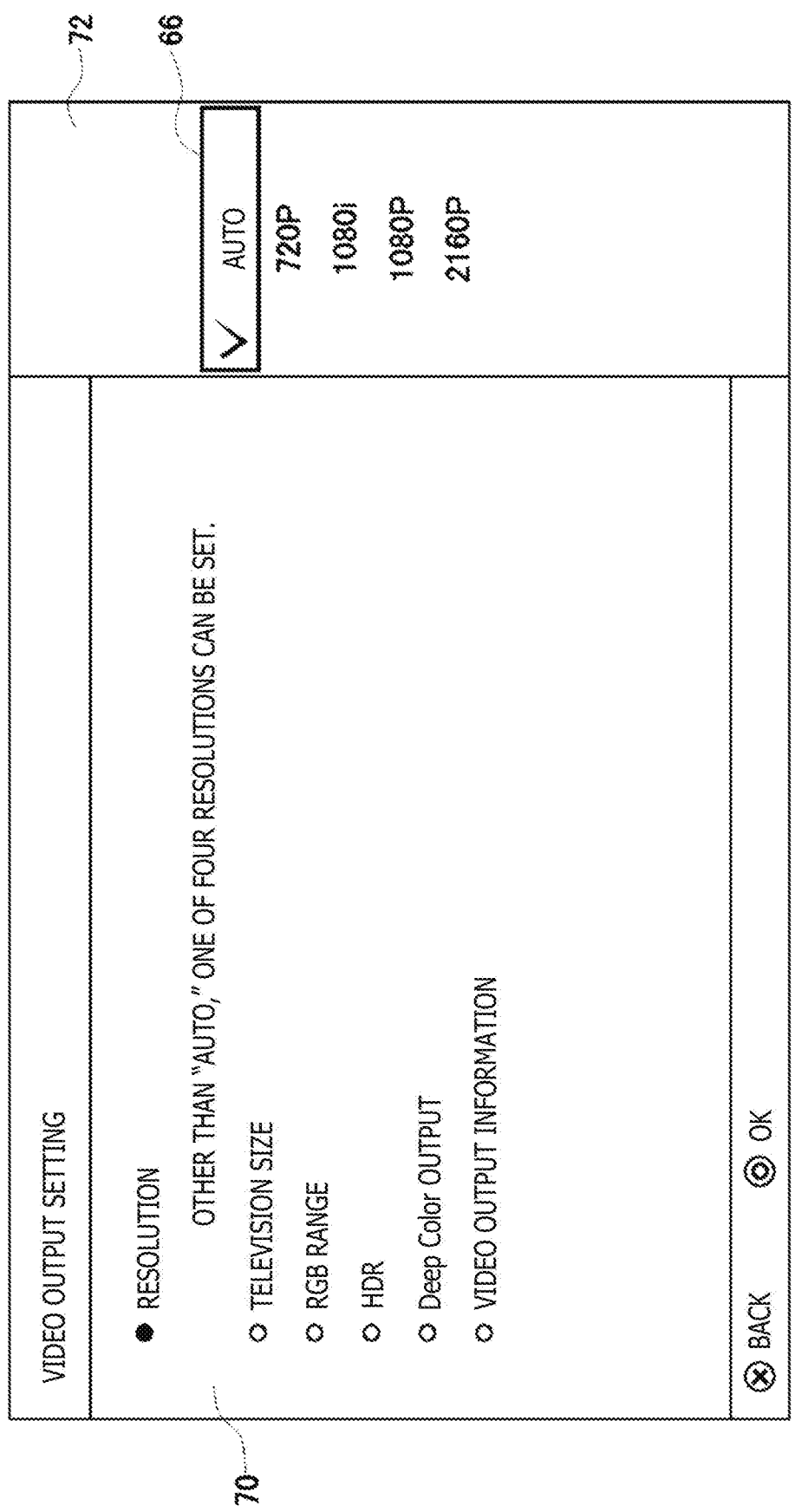
FIG. 6 is a schematic diagram depicting a typical resolution selection region.

FIG. 6 depicts a typical resolution selection region. A resolution selection region 72 constitutes part of the video output setting screen 70. The setting of "Resolution" defines the resolution for video data to be output to the display device 4. The screen generating part 114 displays explanatory text regarding the setting of "Resolution" on the video output setting screen 70, and lists optional settings of "Resolution" in the resolution selection region 72.

The setting of "Resolution" is defaulted to "Auto." When "Resolution" is set to "Auto," the output processing part 118 causes the display device 4 to output videos at an optimum resolution automatically selected in response to the request by the application from among the display resolutions available with the display device 4. With the embodiment, it is assumed that the display device 4 is a 4K television set, i.e., a UHD television set supporting the maximum output resolution of 2160 p of the information processing apparatus 10. Other than "Auto," the user may select one of the options "720 p," "1080 i," "1080 p," and "2160 p" of the output resolution by moving the focus frame 66. The setting registering part 110 registers to the information holding part 130 the setting selected by the user on the video output setting screen 70. In the case where the display device 4 is a 2K television set not supporting the resolution of 2160 p, the "2160 p" option of the output resolution is rendered non-selectable. When a setting other than "Auto" is selected in the resolution selection region 72, the information processing apparatus 10 outputs video data to the display device 4 at the selected resolution.

The setting of "RGB Range" defines the range of color gradation for output to the display device 4. The setting of "RGB Range" is defaulted to "Auto." However, the display device 4 may have a different color gradation input range depending on the device type and may present a faulty screen display due to the different input range. In such a case, the user changes the setting by moving the focus frame 66 onto the "RGB Range" to have optional "RGB Range" settings displayed for the change.

The setting of "HDR" defines whether to be able or disable the HDR output function. Here, the HDR output function is a function that outputs video luminance in a High Dynamic Range (HDR). On the display, videos in the HDR reproduce more realistic brightness than videos in the Standard Dynamic Range (SDR).

Figure 7:
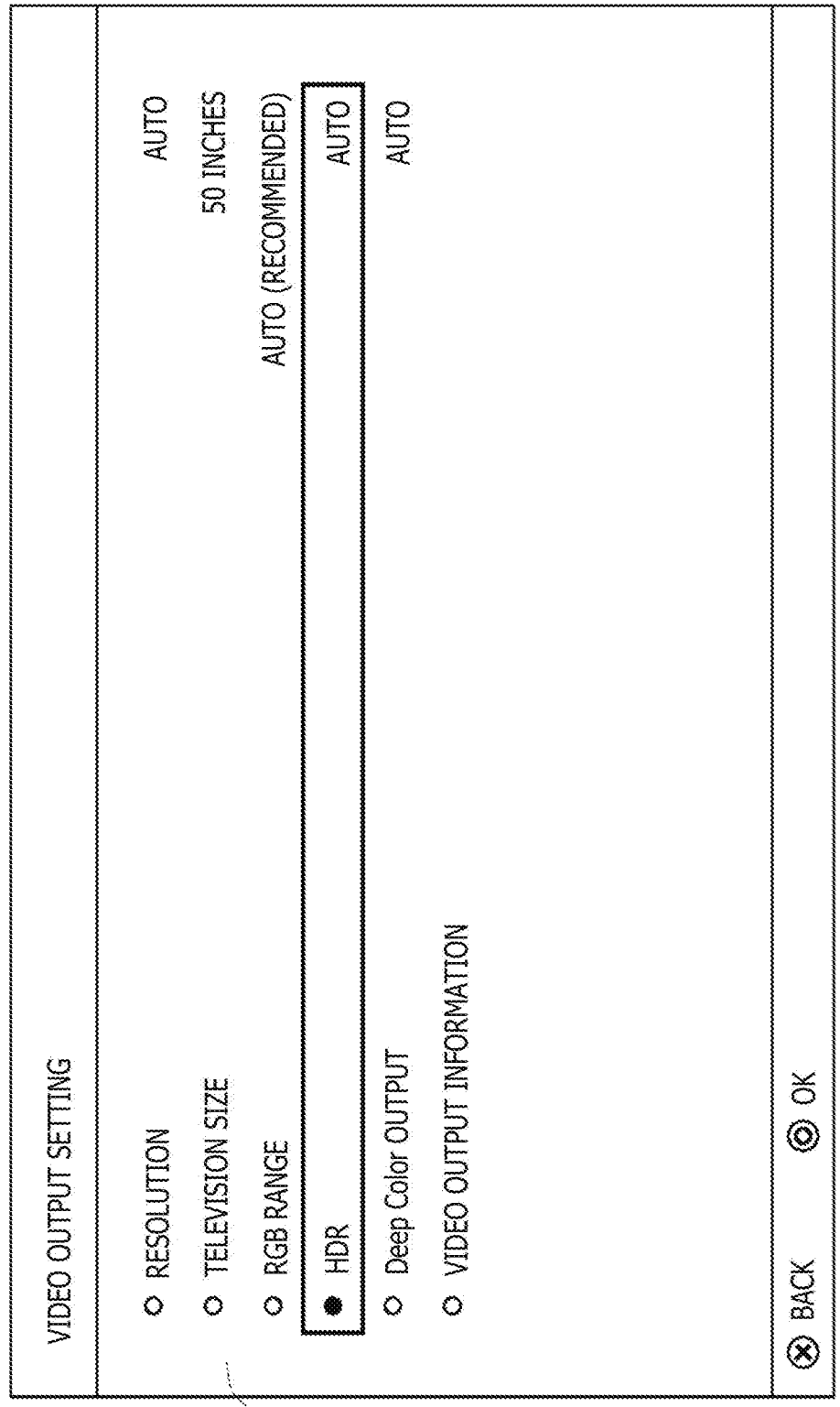
FIG. 7 is a schematic diagram depicting how a focus frame is typically placed.

FIG. 7 depicts how the focus frame 66 is typically placed in the display region of "HDR." When the user operates the OK button of the input apparatus 6 in this state, the screen generating part 114 displays the setting selection region of "HDR."

Figure 8:
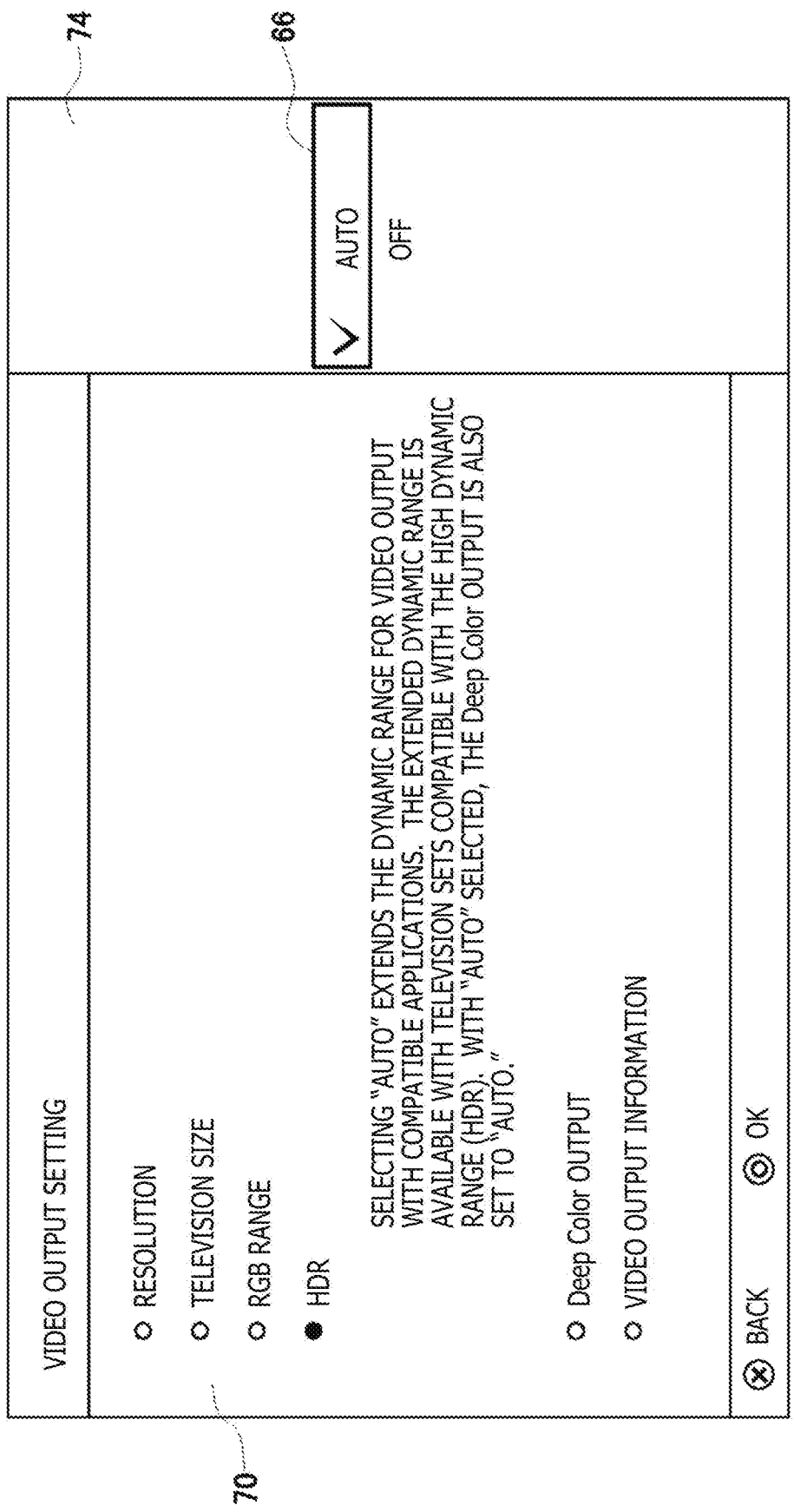
FIG. 8 is a schematic diagram depicting a typical HDR setting region.

FIG. 8 depicts a typical HDR setting region. An HDR setting region 74 constitutes part of the video output setting screen 70. The setting of "HDR" defines whether to enable or disable the HDR output function for output to the display device 4. The screen generating part 114 displays the options of the setting in the HDR setting region 74. In the HDR setting region 74, the setting of "Auto" is used to enable the HDR output function supported by the display device 4, and the setting of "Off" is used to disable the HDR output function.

With "HDR" set to "Auto," the output processing part 118 outputs HDR video data to the display device 4 in the case where the application is capable of generating HDR videos. On the other hand, if "HDR" is set to "Off," the output processing part 118 outputs SDR video data to the display device 4 even in the case where the application is capable of generating HDR videos or where the display device 4 is capable of HDR output. In the case where HDR output is not desired, the user moves the focus frame 66 onto "Off" and operates the OK button of the input apparatus 6.

On the video output setting screen 70, the screen generating part 114 displays an explanatory text regarding the HDR setting. The explanatory text states that when "Auto" is selected, the display device 4 displays videos in the high dynamic range where the application and the display device 4 support the HDR, and that with "Auto" selected, the setting of "Deep Color Output" is automatically defaulted to "Auto."

Here, the setting of "Deep Color Output" defines whether to enable or disable the function of outputting videos by expanding the color gamut expressed in 24 bits with 8 bits for each color (i.e., deep color output function). When the deep color output function is enabled, videos in an expanded color gamut are reproduced on the display. The HDR output function and the deep color output function are two different functions in terms of video output. For this reason, the region for selecting the enabling or disabling of one function and the region for selecting the enabling or disabling of the other function are provided separately from each other on the video output setting screen 70.

In the information processing system 1 of the embodiment, the output processing part 118 also provides deep color output whenever video data is output in HDR in order to ensure ultra-high-definition video display on the display device 4. Thus when the user selects "Auto" in the HDR setting region 74, the input receiving part 102 receives the selecting operation, and the setting registering part 110 registers the setting of "Auto" for "HDR" and forcibly registers the setting of "Auto" for "Deep Color Output" at the same time. That is, in the case where the user sets the enabling of the HDR output function, the deep color output function is automatically enabled in a mutually linked manner. Thus what is provided here is a simplified user interface that spares the user the need to separately set the enabling of the deep color output function whenever setting the enabling of the HDR output function.

It was explained above that with the embodiment, setting "HDR" to "Auto" entails setting "Deep Color Output" to "Auto" in a mutually linked manner. However, in the case where there are other video specifications required for implementing the HDR output function, it is preferred that these video specifications be also set forcibly to the setting needed to implement the HDR output function.

When the user operates the OK button of the input apparatus 6 with the focus frame 66 placed onto the display region of "Auto" in the HDR setting region 74, the setting registering part 110 registers to the information holding part 130 the settings of "Auto" for "HDR" and for "Deep Color Output." At the same time, the screen generating part 114 causes the display device 4 to display the video output setting screen 70 (e.g., see FIG. 7) on which the settings of "HDR" and "Deep Color Output" are both "Auto." The display allows the user to verify that the HDR output function is set to be enabled, for example.

When the user operates the OK button of the input apparatus 6 with the focus frame 66 placed onto the display region of "Off" in the HDR setting region 74, the setting registering part 110 registers the setting of "Off" for "HDR" to the information holding part 130 but does not forcibly change the setting of "Deep Color Output." That is, whether the setting of "Deep Color Output" is "Auto" or "Off," that setting is left unchanged. Because the HDR output function and the deep color output function are basically separate video parameters, it is preferred that the setting registering part 110 not change the setting of the deep color output function even if the HDR output function is disabled.

Figure 9:
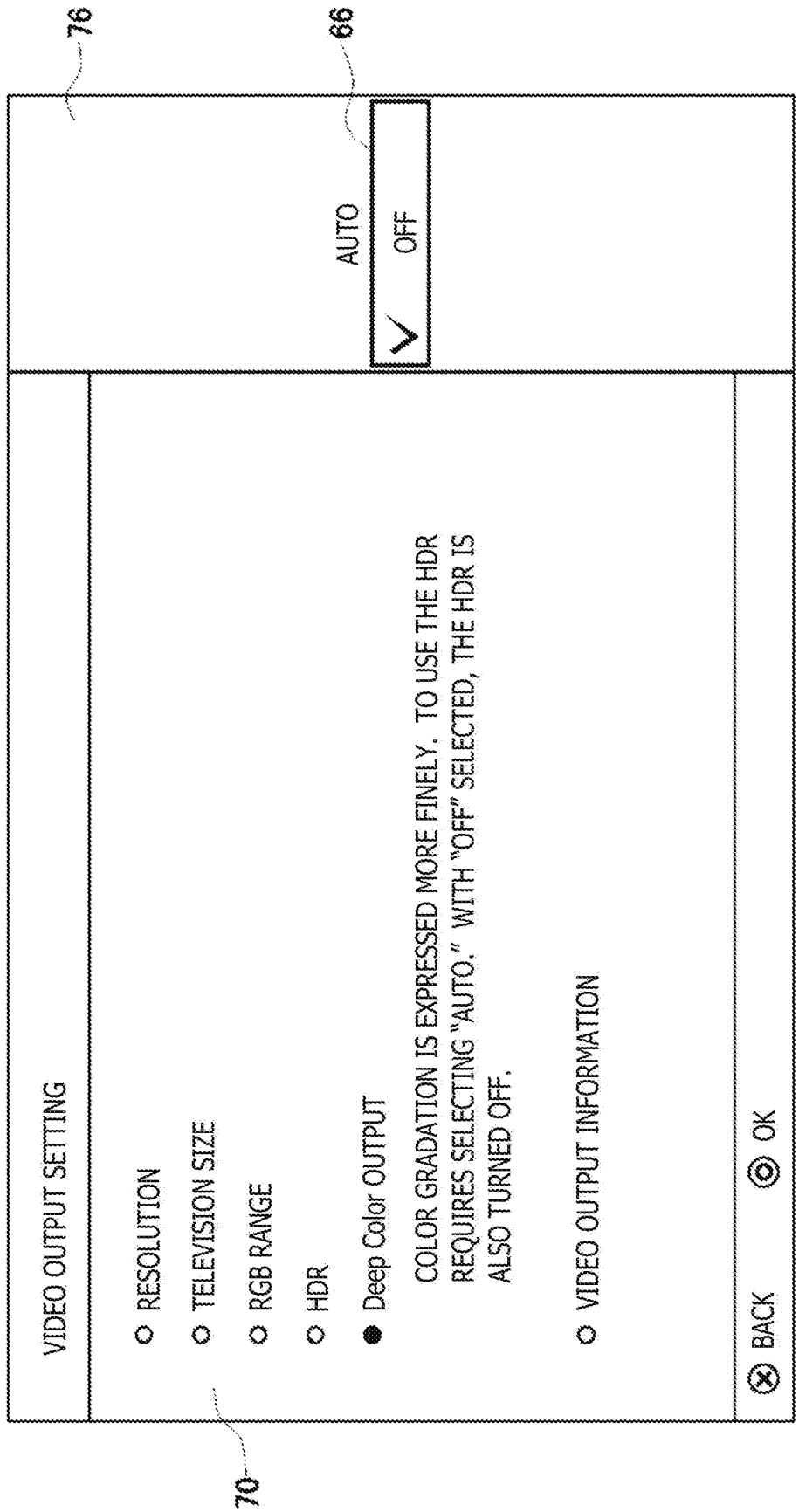
FIG. 9 is a schematic diagram depicting a typical deep color setting region.

FIG. 9 depicts a typical deep color setting region. A deep color setting region 76 constitutes part of the video output setting screen 70. The setting of "Deep Color Output" defines the enabling/disabling of the deep color output function for output to the display device 4. The screen generating part 114 displays the setting options in the deep color setting region 76. In the deep color setting region 76, the setting of "Auto" is used to enable the deep color output function supported by the display device 4, and the setting of "Off" is used to disable the deep color output function.

When "Deep Color Output" is set to "Auto," the output processing part 118 outputs deep color video data to the display device 4 in the case where the output processing part 118 or the application is capable of generating deep color videos. On the other hand, when "Deep Color Output" is set to "Off," the output processing part 118 outputs video data with a standard color depth, i.e., in 8 bits for each color, to the display device 4 even if the application is capable of generating deep color videos or if the display device 4 is capable of deep color output. In the case where deep color output is not desired, the user moves the focus frame 66 onto "Off" and operates the OK button of the input apparatus 6.

On the video output setting screen 70, the screen generating part 114 displays an explanatory text regarding the deep color output setting. The explanatory text states that when "Auto" is selected, color gradation is finely expressed, that to use HDR requires selecting "Auto," and that selecting "Off" automatically sets "HDR" to "Off."

When the user operates the OK button of the input apparatus 6 with the focus frame 66 placed onto the display region of "Auto" in the deep color setting region 76, the setting registering part 110 registers to the information holding part 130 the setting of "Auto" for "Deep Color Output." At this point, the setting registering part 110 does not forcibly change the setting of "HDR." That is, whether the setting of "HDR" is "Auto" or "Off," that setting is left unchanged. Because the HDR output function and the deep color output function are basically separate video parameters, it is preferred that the setting registering part 110 not change the setting of the HDR output function even if the deep color output function is abled.

On the other hand, when the user operates the OK button of the input apparatus 6 with the focus frame 66 placed onto the display region of "Off" is the deep color setting region 76 as depicted in FIG. 9, the input receiving part 102 receives the selecting operation, and the setting registering part 110 registers the setting of "Off" for "Deep Color Output" and forcibly registers the setting of "Off" for "HDR" at the same time. That is, in the case where the user sets the disabling of the deep color output function, the HDR output function is automatically disabled in a mutually inked manner. This makes it possible to suppress execution of the HDR output function in a state where deep color output is not carried out.

Figure 10:
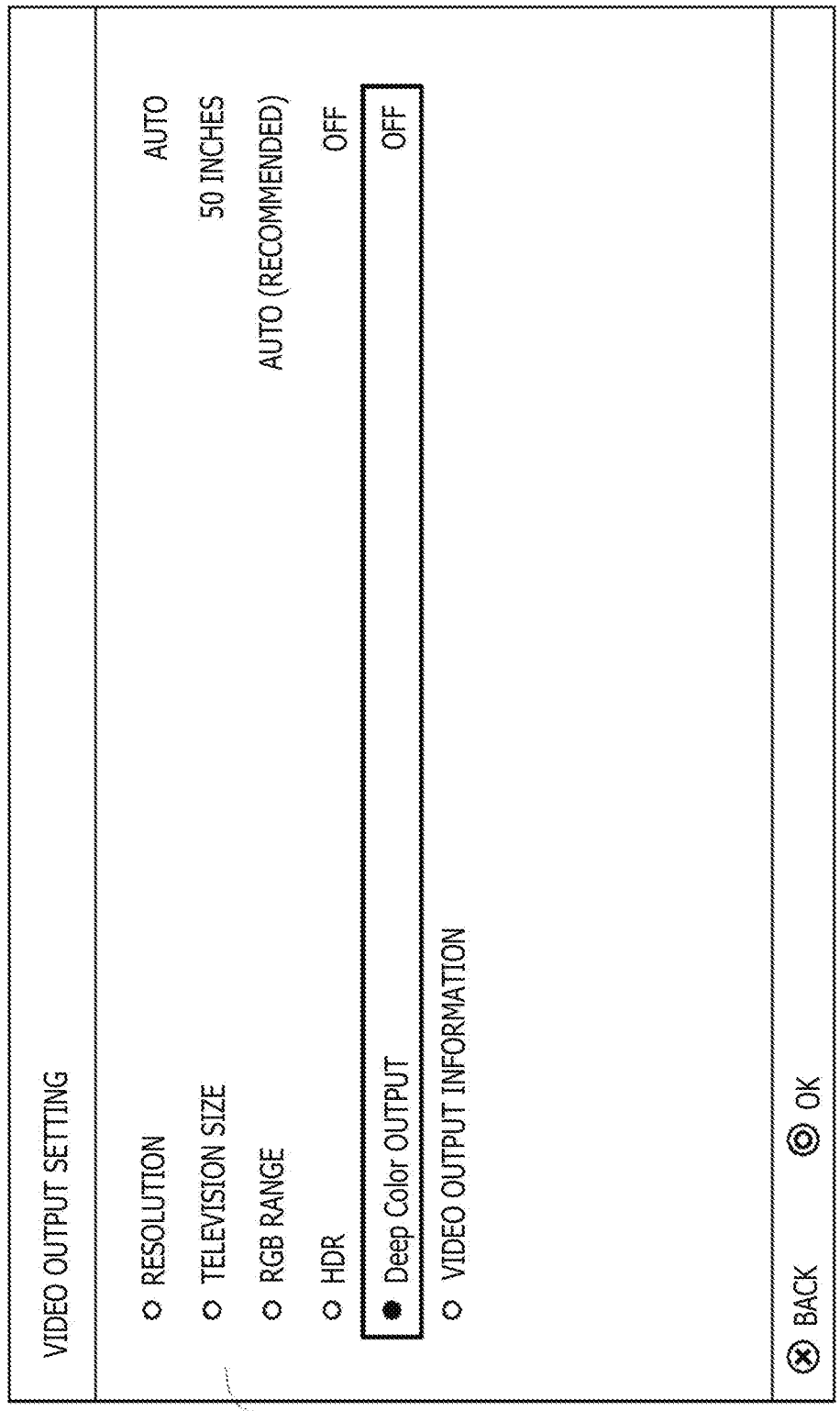
FIG. 10 is a schematic diagram depicting another typical video output setting screen.

FIG. 10 depicts another typical video output setting screen. When "Deep Color Output" is set to "Off" in the deep color setting region 76 in FIG. 9, the setting registering part 110 registers the setting of "Off" for "Deep Color Output" and for "HDR" to the information holding part 130. At the same time, the screen generating part 114 causes the display device 4 to display the video output setting screen 70 on which "Deep Color Output" and "HDR" are both set to "Off." This allows the user to verify that the disabling of the HDR output function is set in linkage with the deep color output function being disabled.

As described above, the screen generating part 114 of the embodiment generates the video output setting screen 70 on which the user selects at least the settings of "HDR" and "Deep Color Output." The setting of "HDR" has two selectable values, i.e., a first value ("Auto") for enabling the HDR output function, and a second value ("Off") for disabling the HDR output function. The setting of "Deep Color Output" also has two selectable values, i.e. a third value ("Auto") for enabling the deep color output function, and a fourth value ("Off") for disabling the deep color output function.

When the user selects the first value ("Auto") for "HDR," the setting registering part 110 registers the first value ("Auto") for "HDR" and also registers automatically the third value ("Auto") for "Deep Color Output." These video output settings enable the deep color output function whenever the HDR output function is executed.

On the other hand, when the user selects the fourth value ("Off") for "Deep Color Output," the setting registering part 110 registers the fourth value ("Off") for "Deep Color Output" and also registers automatically the second value ("Off") for "HDR." This avoids the case in which the HDR output function is executed while the deep color output function is being disabled. The above operations of the setting registering part 110 allow tale user to set easily the enabling/disabling of the HDR output function. Also, when the user is presented with an explanatory text regarding the HDR setting or the deep color setting, the user is able to verify that one of the two settings is changed in a manner dependent on the other setting.

Incidentally, when the user selects the second value ("Off") for "HDR," the setting registering part 110 does not change the setting of "Deep Color Output." Also, when the user selects the third value ("Auto") for "Deep Color Output," the setting registering part 110 does not change the setting of "HDR." Since the HDR output function and the deep color output function are basically separate video parameters, it is preferred that their settings be left independent of each other in the above cases.

The setting registering part 110 registers to the information holding part 130 the settings of multiple items regarding the video specifications in the manner described above. This completes the video output settings. The user can modify the video output settings at a desired timing. After the settings of multiple items regarding the video specifications have been registered to the information holding part 130, the output parameter determining part 116 determines the output parameters for video data to be output to the display device 4 by referencing the video data specifications set in the application and the settings held in the information holding part 130.

What follows is an explanation of the process of executing the application.

When the input receiving part 102 receives a game start request from the user, the output parameter determining part 116 determines the output parameters for video and audio data and supplies the determined parameters to the output processing part 118. Thereafter, the application processing part 112 starts the game program to generate video and audio data in accordance with the parameter information. Explained hereunder is a case where the game application possesses the PARAM file depicted in FIG. 3. In the paragraphs that follow, the process of generating audio data will not be discussed.

Referring to FIG. 3, the PARAM file defines the parameter information regarding the specifications for generating video data, the information specifying that the rendering resolution is to be "2160 p," the color depth of each color to be "10 bits," and the HDR technique to be "HDR 10." The application processing part 112 generates game video data in accordance with these video data specifications and supplies the generated data to the output processing part 118.

Before the game program is started, the output parameter determining part 116 acquires the parameter information from the application processing part 112. The output parameter determining part 116 determines the output parameters for video data to be output to the display device 4, i.e., determines more specifically the resolution, luminance range, and color depth, on the basis of the video data specifications included in the parameter information and the settings of the output video specifications registered to the information holding part 130 by the setting registering part 110.

In the case where "Resolution" for video data to be output to the display device 4 is set to "Auto," one of the optional resolutions 720 p, 1080 i, 1080 p, and 2160 p in FIG. 6 that matches the rendering resolution stipulated in the PARAM file is determined as the output resolution. Here, the rendering resolution included in the PARAM 2160 p, so that the output parameter determining part 116 determines the output resolution as 2160 p.

In the case where "HDR" and "Deep Color Output" for video data to be output to the display device 4 are set to "Auto," the PARAM file in FIG. 3 includes the setting information regarding "Deep Color" and "HDR." For this reason, the output parameter determining part 116 determines the color depth of each color as 10 bits and the HDR technique as HDR 10.

The output parameter determining part 116 supplies the determined output parameters to the output processing part 118. The output processing part 118 compares the specifications for video data generated by the application processing part 112 with the output parameters determined by the output parameter determining part 116. If the specifications for video data generated by the application processing part 112 are the same as the output parameters determined by the output parameter determining part 116, the output processing part 118 encrypts using the HDCP protocol the video data generated by the application processing part 112 without making any change to the video data specifications, and outputs the encrypted data to the display device 4. As discussed above, if "Resolution," "HDR," and "Deep Color Output" are set to "Auto," the video data generated by the application processing part 112 is in most cases encrypted unmodified before being transmitted to the display device 4.

If the specifications for video data generated by the application processing part 112 are different from the output parameters determined by the output parameter determining part 116, the output processing part 118 converts the video data generated by the application processing part 112 in a manner compatible with the output parameters determined by the output parameter determining part 116, encrypts the converted video data, and outputs the encrypted data to the display device 4. The display device 4 of the embodiment is a television set capable of 4K output and supporting 2160-p output. If the display device 4 is a 2K television set, for example, it does not support 2160-p output. In this case, if the output parameter determining part 116 has determined the output resolution as 1080 p, the output processing part 118 is required to down-convert to the resolution of 1080 p the game video data generated at 2160 p.

The output processing part 118 has a converter that up-converts or down-converts the video data generated at the rendering resolution stipulated in the PARAM file to the output resolution determined by the output parameter determining part 116. The converter may be either configured as a hardware scalar or implemented by software that has a resolution conversion function. The output processing part 118 encrypts the video data in a manner compatible with the output parameters, encrypts the converted video data using the HDCP protocol, and outputs the encrypted data to the display device 4.

As soon as the output parameter determining part 116 has performed the process of determining the output parameters, the application processing part 112 carries out the process of starting up the game program. At this point, the HDCP information acquiring part 108 performs in parallel the process of acquiring HDCP information, with the output parameter determining part 116 carrying out HDCP authentication. The authentication is the process of determining the version of the HDCP protocol for use with regard to the display device 4. Upon completion of the HDCP authentication, the application processing part 112 is notified thereof. This allows the application processing part 112 to recognize that the HDCP authentication is already complete by the time the game program is started. The application processing part 112 can then get ready to perform the game application immediately.

As depicted in FIG. 3, the application possesses the PARAM file that determines execution/non-execution of output encryption using the HDCP protocol and designates the HDCP version for the output encryption. The output processing part 118 of the embodiment supports two versions of the protocol, i.e., HDCP 1.4 and HDCP 2.2. The display device 4 supports at least HDCP 1.4 and may also support HDCP 2.2 depending on the device type.

The HDCP information acquiring part 108 acquires information regarding the HDCP version that can be supported by the display device 4, and supplies the acquired version information to the output parameter determining part 116. The HDCP information acquiring part 108 receives the version information from the display device 4 indicating either that HDCP 1.4 alone is supported or that both HDCP 1.4 and HDCP 2.2 are supported.

As described above, the output parameter determining part 116 acquires the parameter information from the application processing part 112. The parameter information includes information designating execution/non-execution of output encryption as well as information regarding the HDCP version for use at the time of output encryption. The output parameter determining part 116 determines the HDCP version to be used on the basis of the version information provided by the HDCP information acquiring part 108 and the parameter information provided by the application processing part 112. The output parameter determining part 116 notifies the output processing part 118 of the determined HDCP version. The output processing part 118 encrypts the digital data to be output to the display device 4 using the HDCP protocol of the notified version.

Explained below are the criteria for determining which of HDCP 1.4 and HDCP 2.2 is to be used in the case where output encryption is "required" by the parameter information stipulating the data specifications (PARAM file).

(a) In the case where the display device 4 supports only HDCP 1.4

In this case, HDCP 2.2 is not usable. The output parameter determining part 116 thus determines the use of HDCP 1.4 for encryption.

(b) In the case where the display device 4 supports both HDCP 1.4 and HDCP 2.2

(b-1) If the HDCP version information included in the parameter information designates HDCP 2.2, the output parameter determining part 116 determines the use of HDCP 2.2 for encryption.

(b-2) If the HDCP version information included in the parameter information designates HDCP 1.4, the output parameter determining part 116 determines the use of either HDCP 1.4 or HDCP 2.2 for encryption depending on the output parameters. Specifically, if 4K output and HDR output are set by the output parameters, the output parameter determining part 116 adopts HDCP 2.2. If 2K output is set, the output parameter determining, part 116 adopts HDCP 1.4. This point is elaborated below.

The information processing system 1 of the embodiment provides an application execution environment that enables transmission of video data to display devices other than the display device 4 in FIG. 1. The other display devices include, for example, a Head-Mounted Display Apparatus (HMD) worn by the user on the head. In this execution environment, the information processing apparatus 10 supplies video data to a second information processing apparatus (called the processing unit hereunder). In turn, the processing unit transfers the video data to the HMD.

In this case, if the processing unit and the HMD possess output functions equivalent to those of the display device 4, such as the 4K output function and HDR output function, and support HDCP 2.2, then the output parameter determining part 116 can determine the output parameters and the HCP version regardless of the processing unit and the HMD being connected. However, there may be a case where the processing unit and the HMD include output functions lesser in degree than those of the display device 4, specifically where the processing unit and the HMD possess only the 2K output function and do not support HDR output and HDCP 2.2. In that case, when the processing unit and the HMD are connected, the output parameter determining part 116 needs to change the output parameters and the HDCP version in keeping with the output functions or the processing unit and HMD being connected.

For that reason, if the HMD is connected while the output processing part 118 is outputting 4K videos and/or HDR videos to the display device 4, the output parameters and the HDCP version are changed. While the process of video output change is underway, the output processing part 118 outputs black screen video data. The period of black screen output is approximately several seconds long. The display of the black screen is unavoidable at the time of changing the output parameters and the HDCP version.

As described above, when the processing unit and the HMD are connected, the output resolution is set to 2K and HDR output is turned off. Data encryption is then carried out using HDCP 1.4. Viewed from the opposite point of view, there is no need to change the output parameters when the HMD or like device is connected in the case where the output resolution before the connection of the HMD is 2K and where HDR output is turned off.

In that case, if the HDCP version is also unchanged, connecting the HMD or like device leaves the output parameters and the HDCP version unchanged. That means the black screen need not be displayed. Thus if the output resolution is 2K before the connection of the HMD or like device and if HDR output is turned off, the output parameter determining part 116 determines the use of HDCP 1.4. When the HDCP version is set as described above, there is no need to change the output parameters and the HDCP version when the HMD or like device is connected. This provides the advantage of avoiding black screen display. That is, in the case where the output parameter determining part 116 sets the output parameters in a manner compatible with the output functions of the additionally connected processing unit and HMD, the HDCP version is determined accordingly. This eliminates the need for displaying the black screen when the HMD or like device is connected.

The present invention has been described above in conjunction with a specific embodiment presented as an example. It is to be understood by those skilled in the art that suitable combinations of constituent elements and various processes of the embodiment described above will lead to further variations of the present invention and that such variations also fall within the scope of this invention.

On the video output setting screen 70 in FIG. 5, the item of "Video Output Information" provides a user interface which, when selected, displays the set video output information. Selecting this item causes the screen generating part 114 to display such video output information as the resolution, color format, and HDCP version. Where the display device 4 is a 4K television set and where the color format is currently set to be lower than maximum image quality, the settings may have been determined in a manner dependent on the initial settings of the 4K television set. Thus in the case where the color format is set to be lower than maximum image quality, the screen generating part 114 may present the user with a possibility that the color format of higher quality may be output if the settings of the television set are changed.

REFERENCE SIGNS LIST

1 Information processing system
4 Display device
5 HDMI cable
10 Information processing apparatus
60 gain system
70 Video output setting screen
72 Resolution selection region
74 HDR setting region
76 Deep color setting region
102 Input receiving part
104 Device information acquiring part
106 Characteristic information acquiring part
108 HDCP information acquiring part
110 Setting registering part
112 Application processing part
114 Screen generating part
116 Output parameter determining part
118 Output processing part
130 Information holding part

INDUSTRIAL APPLICABILITY

The present invention is applicable to technical fields in which video data is transmitted to display devices.

The invention claimed is:

1. An information processing apparatus for transmitting video data to a display device, the information processing apparatus comprising:
a screen generating part configured to generate an output setting screen on which a user selects settings of a plurality of items regarding specifications for the video data to be output to the display device; and
a setting registering part configured to register the settings selected by the user on the output setting screen,
wherein the screen generating part generates the output setting screen on which the user selects the settings of a first item and a second item, the first item having a first value and a second value as selectable settings, the second item having a third value and a fourth value as selectable settings,
wherein, when the user selects the first value for the first item, the setting registering part selects and registers the first value for the first item and also registers the third value for the second item even if the fourth value for the second item is currently selected,
wherein, when the user selects the fourth value for the second item, the setting registering part selects and registers the fourth value for the second item and also registers the second value for the first item even if the first value for the first item is currently selected,
wherein, when the user selects the second value for the first item, the setting registering part does not change the setting for the second item,
wherein, when user selects the third value for the second item, the setting registering part does not change the setting for the first item,
wherein the first value for the first item is the setting for enabling a first function supported by the display device, the second value for the first item is the setting for disabling the first function, the third value for the second item is the setting for enabling a second function supported by the display device, and the fourth value for the second item is the setting for disabling the second function, and
wherein the first function is a high dynamic range output function and the second function is a deep color output function.

2. The information processing apparatus according to claim 1, further comprising:
a parameter determining part configured to acquire data specifications set in an application and, on the basis of the acquired data specifications and the settings of the plurality of items registered by the setting registering part, to determine the resolution, luminance range, and color depth for the video data to be output to the display device.

3. The information processing apparatus according to claim 2, wherein the parameter determining part determines an HDCP version on the basis of the resolution of the video data to be output.

4. A video specification setting method executed by a processor for setting specifications for video data to be output to a display device, the video specification setting method comprising:
generating an output setting screen on which a user selects settings of a plurality of items regarding the specifications for the video data to be output to the display device; and
registering the settings selected by the user on the output setting screen, wherein the output setting screen generating generates the output setting screen on which the user selects the settings of a first item and a second item, the first item having a first value and a second value as selectable settings, the second item having a third value and a fourth value as selectable settings, wherein, when the user selects the first value for the first item, the setting registering selects and registers the first value for the first item and also registers the third value for the second item even if the fourth value for the second item is currently selected, wherein, when the user selects the fourth value for the second item, the setting registering selects and registers the fourth value for the second item and also registers the second value for the first item even if the first value for the first item is currently selected, wherein, when the user selects the second value for the first item, the setting registering does not change the setting for the second item, wherein, when user selects the third value for the second item, the setting registering does not change the setting for the first item, wherein the first value for the first item is the setting for enabling a first function supported by the display device, the second value for the first item is the setting for disabling the first function, the third value for the second item is the setting for enabling a second function supported by the display device, and the fourth value for the second item is the setting for disabling the second function, and wherein the first function is a high dynamic range output function and the second function is a deep color output function.

5. A non-transitory computer-readable medium having stored thereon a program for a computer connected with a display device, the program comprising:

by a screen generating part, generating an output setting screen on which a user selects settings of a plurality of items regarding specifications for video data to be output to the display device; and by a setting registering part, registering the settings selected by the user on the output setting screen, wherein the output setting screen generating includes generating the output setting screen on which the user selects the settings of a first item and a second item, the first item having a first value and a second value as selectable settings, the second item having a third value and a fourth value as selectable settings, wherein, when the user selects the first value for the first item, the setting registering selects and registers the first value for the first item and also registers the third value for the second item even if the fourth value for the second item is currently selected, wherein, when the user selects the fourth value for the second item, the setting registering selects and registers the fourth value for the second item and also registers the second value for the first item even if the first value for the first item is currently selected, wherein, when the user selects the second value for the first item, the setting registering does not change the setting for the second item, wherein, when user selects the third value for the second item, the setting registering does not change the setting for the first item, wherein the first value for the first item is the setting for enabling a first function supported by the display device, the second value for the first item is the setting for disabling the first function, the third value for the second item is the setting for enabling a second function supported by the display device, and the fourth value for the second item is the setting for disabling the second function, and wherein the first function is a high dynamic range output function and the second function is a deep color output function.

* * * * *